United States Patent
Meyer

(10) Patent No.: US 12,004,540 B2
(45) Date of Patent: Jun. 11, 2024

(54) CHIP PRODUCT

(71) Applicant: Texas Tech University System, Lubbock, TX (US)

(72) Inventor: Richard Schlomer Meyer, Harrison, ID (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 16/775,337

(22) Filed: Jan. 29, 2020

(65) Prior Publication Data

US 2021/0227861 A1    Jul. 29, 2021

(51) Int. Cl.
| | | |
|---|---|---|
| A23L 13/60 | (2016.01) | |
| A23B 4/033 | (2006.01) | |
| A23B 7/022 | (2006.01) | |
| A23L 13/74 | (2023.01) | |
| A23L 19/00 | (2016.01) | |

(52) U.S. Cl.
CPC ............. *A23L 13/67* (2016.08); *A23B 4/033* (2013.01); *A23B 7/022* (2013.01); *A23L 13/74* (2016.08); *A23L 19/09* (2016.08); *A23V 2002/00* (2013.01)

(58) Field of Classification Search
CPC .... A23L 19/00; A23L 13/52; A23L 13/70–74; A23L 19/09; A23L 19/12; A23L 19/13; A23L 19/135; A23L 13/60–67; A23L 5/13; A23B 7/022; A23B 4/03–033; A23B 4/044; A23B 7/02; A47J 27/10; A47J 27/18
USPC ......................................................... 426/242
See application file for complete search history.

(56) References Cited

U.S. PATENT DOCUMENTS

| | | | | | |
|---|---|---|---|---|---|
| 3,512,993 | A * | 5/1970 | Hung | ............... | A23L 7/13 426/646 |
| 5,314,706 | A * | 5/1994 | Colarow | ............... | A23L 27/60 426/589 |
| 5,827,550 | A * | 10/1998 | Berglund | ............... | A23B 4/12 426/641 |
| 6,797,295 | B2 * | 9/2004 | Cornelissen | ............... | A23D 7/003 426/94 |
| 2003/0113433 | A1 * | 6/2003 | Tempesta | ............... | A23L 13/60 426/646 |
| 2006/0222752 | A1 * | 10/2006 | Furtaw | ............... | A22C 7/0023 426/641 |
| 2009/0311365 | A1 * | 12/2009 | Means | ............... | A23K 50/10 426/480 |
| 2010/0062135 | A1 * | 3/2010 | Domazakis | ............... | A23L 13/45 426/574 |
| 2010/0159082 | A1 * | 6/2010 | Rupasinghe | ............... | A23B 7/085 426/267 |
| 2010/0215826 | A1 * | 8/2010 | Campbell | ............... | A23L 7/13 426/549 |
| 2010/0278974 | A1 * | 11/2010 | Van Hulst | ............... | A23L 29/206 426/61 |
| 2010/0297316 | A1 * | 11/2010 | Gutzmann | ............... | A23L 13/70 426/332 |
| 2012/0196021 | A1 * | 8/2012 | Anand | ............... | A23L 19/09 426/560 |
| 2015/0010690 | A1 * | 1/2015 | Domazakis | ............... | A23L 13/60 426/641 |
| 2015/0230501 | A1 * | 8/2015 | Bertin | ............... | A23P 20/20 426/89 |
| 2016/0255867 | A1 * | 9/2016 | Niils | ............... | A23L 19/09 |
| 2016/0338385 | A1 * | 11/2016 | Willutzki | ............... | A23L 13/67 |
| 2017/0188613 | A1 * | 7/2017 | Rosales | ............... | A23L 13/42 |
| 2017/0339990 | A1 * | 11/2017 | Tennant | ............... | A23L 13/67 |
| 2018/0192657 | A1 * | 7/2018 | Repinski | ............... | A21D 2/40 |
| 2018/0343877 | A1 | 12/2018 | Van Eekeren et al. | | |
| 2019/0045809 | A1 * | 2/2019 | Lee | ............... | A23J 3/14 |
| 2019/0069568 | A1 * | 3/2019 | Meyer | ............... | A23L 3/349 |
| 2019/0124963 | A1 | 5/2019 | Fantel et al. | | |

FOREIGN PATENT DOCUMENTS

| | | | | | |
|---|---|---|---|---|---|
| CN | 103704765 | A * | 4/2014 | ............... | A23B 4/22 |
| CN | 109953247 | A * | 7/2019 | | |
| GB | 2459575 | A * | 11/2009 | ............... | A23L 13/428 |
| GB | 2494068 | A * | 2/2013 | ............... | A23L 19/00 |
| JP | 2000157218 | A * | 6/2000 | | |
| WO | WO-2015127359 | A1 * | 8/2015 | ............... | A23B 4/28 |
| WO | WO-2018187851 | A1 * | 10/2018 | ............... | A23L 17/40 |
| WO | WO-2019132959 | A1 * | 7/2019 | ............... | A23D 7/00 |

OTHER PUBLICATIONS

"What is High-Oleic Sunflower Oil?" mikey's Sep. 25, 2019 https://eatmikeys.com/blogs/blog/what-is-high-oleic-sunflower-oil (Year: 2019).*
National Sunflower Association; "High-Oleic Sunflower Oil"; May 3, 2016; https://web.archive.org/web/20160503225451/https://www.sunflowernsa.com/oil/High-Oleic-Sunflower-Oil/ (Year: 2016).*
Broaddus, Hannah; "Why Choose High-Oleic Instead of Regular Oil?"; Centra Foods; Jul. 25, 2016 https://www.centrafoods.com/blog/why-choose-high-oleic-instead-of-regular-oil (Year: 2016).*

* cited by examiner

*Primary Examiner* — Drew E Becker
*Assistant Examiner* — Austin Parker Taylor
(74) *Attorney, Agent, or Firm* — Edwin S. Flores; Daniel J. Chalker; Chalker Flores, LLP

(57) ABSTRACT

The present invention includes meat chips and methods of making meat chips comprising: blending a meat product and a high oleic oil, and optionally a seasoning, into a meat batter; extruding the meat batter into a casing; cooking to the meat batter; slicing the meat batter into meat slices; and microwaving at a temperature not exceeding 200° F. the meat slices into a meat chip.

7 Claims, No Drawings

CHIP PRODUCT

CROSS-REFERENCE TO RELATED APPLICATIONS

None.

TECHNICAL FIELD OF THE INVENTION

The present invention relates in general to the field of chips, and more particularly, to novel compositions and methods for making chips or crisps from meat.

STATEMENT OF FEDERALLY FUNDED RESEARCH

None.

BACKGROUND OF THE INVENTION

Without limiting the scope of the invention, its background is described in connection with meat-based products.

One such product is taught in United States Patent Publication No. 20190124963, filed by Fantel, et al., entitled "Dehydrated Edible Meat Chip Snack for Humans and Pets". These applicants are said to teach a human and pet edible meat chip snack exhibiting solid physical characteristics with or without the infusion of additional ingredient(s), including: ingredients that are nutritional, increased palatability, increased preservation and or visual appearance benefits, and are highly palatable to humans and pets alike.

Another such product is taught in United States Patent Publication 20180343877, filed by Van Eekeren, et al., entitled "Crisp Meat Chip and System and Method for Making the Same". These applicants are said to teach a crisp meat chip and method and system for making such a meat chip, the meat chip having rippled opposed surfaces, the method including creating a meat log, cooking the meat log, cooling the cooked meat log degrees Fahrenheit, deep chilling the meat log, slicing the meat log into rippled meat slices, drying the meat slices using an air impingement oven and cooling the dried meat slices.

Yet another such product is taught in United States Patent Publication 20170188613, filed by Rosales, et al., entitled, "Meat Crisps and Processes For Producing Same". These applicants are said to teach meat crisps and methods of producing the crisps that is a crunchy meat product comprised of at least ground meat or whole muscle meat pieces. It is said that, generally, the meat is dehydrated and the crunchy meat crisp has a water activity (AO of about 0.3 to about 0.6. The meat crisp also may have a moisture percentage of about 4.5% to about 15%, a crisp thickness of about 0.025-in. to about 0.25-in., and a crispness value of less than 731 kg seconds such that the meat crisp has an appearance, texture, flavor, eating quality, and/or mouth feel similar to other snack chips such as potato or corn chips.

What is needed is a novel composition and methods that improves on prior attempts to make a crisp or chip that has superior flavor, mouthfeel, and that is made with natural ingredients. Further, what are needed are better methods and compositions for processing meats that improve, noticeably, the organoleptic characteristics of meat and meat products.

SUMMARY OF THE INVENTION

In one embodiment, the present invention includes a method of making one or more meat chips comprising: blending a meat product and a high oleic oil, and optionally a seasoning, into a meat batter; extruding the meat batter into a casing; cooking to the meat batter; slicing the meat batter into meat slices; and microwave vacuum drying at a temperature not exceeding 200° F. the meat slices into the one or more meat chip. In one aspect, the meat is selected from at least one of: beef, veal, buffalo, lamb, goat, chicken, pork, emu, ostrich, game hen, squab, guinea fowl, turkey, pheasant, quail, duck, or goose. In another aspect, the high oleic oil is selected from at least one of: a sunflower, soybean, safflower, canola, or algal oil. In another aspect, an emulsion is at least 3, 5, 10, or 15% high oleic oil. In another aspect, the method further comprises one or more preservatives and stabilizers selected from at least one of: phosphates, k-carrageenan, green tea extract, rosemary extract, mixed tocopherols, or celery powder, to 180 ppm nitrites. In another aspect, the cooking step is in a water bath, a smoker, smokehouse, an oven, or a microwave oven. In another aspect, if the meat is beef, then omitting at least one of nitrates and celery powder, or if the meat is chicken omitting nitrates. In another aspect, an emulsion is defined further as comprising at least one of: eggs that comprise one of 4% whole eggs or 2.0% egg yolks or further comprising, by weight, 0.01% to 1.0% of a gum or gum blend including one or more natural gums selected from the group consisting of gum Arabic, guar and Xanthan gum, or 0.2% k-carrageenan. In another aspect, the meat chip has an $A_w$ of 0.05 to 0.20. In another aspect, the meat slices have a thickness or 1, 2, 3, 4 or 5 mm prior to microwaving. In another aspect, the meat is contacted with the emulsion for at least 1 to 90 minutes at room temperature. In another aspect, method further comprises the step of chemical tenderizing the meat selected from the group consisting of aging in the composition, acids, spices, enzymes, and combinations thereof. In another aspect, the method further comprises the step of mechanical tenderizing selected from the group consisting of pounding, needle tenderizing, injecting, grinding, and combinations thereof. In another aspect, the meat is a whole animal, leg, thigh, breast, ribs, flank, loin, sausages, processed meat products, jerky, or other cut of meat, processed or ground meat. In another aspect, the method further comprises the step of fermenting the meat to a pH of 5.4 to 5.6 prior to cooking.

In one embodiment, the present invention includes a meat chip product made by a method comprising: blending a meat product, a high oleic oil, a seasoning, and optionally one or more fruits or vegetables into a meat batter; extruding the meat batter into a casing; cooking to the meat batter; slicing the meat batter into meat slices; and microwave vacuum drying at a temperature not exceeding 200° F. the meat slices into a meat chip. In one aspect, the meat is selected from at least one of: beef, veal, buffalo, lamb, goat, chicken, pork, emu, ostrich, game hen, squab, guinea fowl, turkey, pheasant, quail, duck, or goose. In another aspect, the high oleic oil is selected from at least one of: a sunflower, soybean, safflower, canola, or algal oil. In another aspect, the emulsion is at least 3, 5, 10, or 15% high oleic oil. In another aspect, the meat chip product further comprises one or more preservatives or stabilizers selected from at least one of: phosphates, k-carrageenan, green tea extract, rosemary extract, mixed tocopherols, or celery powder, to 180 ppm nitrites. In another aspect, the cooking step is in a water bath, a smoker, an oven, or a microwave oven. In another aspect, the emulsion is defined further as comprising at least one of: eggs that comprise one of 4% whole eggs or 2.0% egg yolks or further comprising, by weight, 0.01% to 1.0% of a gum or gum blend including one or more natural gums selected from the group consisting of gum Arabic, guar and Xanthan gum, or 0.2% k-carrageenan. In another aspect, the meat chip has an $A_w$ of 0.05 to 0.20. In another aspect, the meat slices have a thickness or 1, 2, 3, 4 or 5 mm prior to microwaving. In another aspect, the meat is contacted with the emulsion for at least 1 to 90 minutes at room temperature. In another aspect, the meat chip product further comprising the step of chemical tenderizing the meat selected from the group consisting of aging in the composition, acids, spices, enzymes, and combinations thereof. In another aspect, the meat chip product further comprising the step of mechanical tenderizing selected from the group consisting of pounding, needle tenderizing, injecting, grinding, and combinations thereof. In another aspect, the meat is a whole animal, leg, thigh, breast, ribs, flank, loin, sausages, processed meat products, jerky, or other cut of meat, processed or ground meat. In another aspect, the meat chip product further comprising the step of fermenting the meat to a pH of 5.4 to 5.6 prior to cooking.

In one embodiment, the present invention includes a method of making a meatless chip comprising: blending a ground or whole fruit, or a ground or whole vegetable, or both the fruit and the vegetable, and a high oleic oil and gluconic acid, and optionally a seasoning, into a meatless batter; extruding the meatless batter into a casing; cooking to the meatless batter; slicing the meatless batter into meat slices; and microwave vacuum drying at a temperature not exceeding 200° F. the meat slices into the one or more meatless chip. In another aspect, the gluconic acid is added at 0.1% to 1.0% weight to weight. In another aspect, the fruit is selected from at least one of: strawberry, blackberry, apricot, peach, raspberry, blueberry, bananas, mango, banana, *Papaya*, passion fruit, plum, pomelo, orange, kiwi, lemon, cherry, pear and apple. In another aspect, the method further comprises adding one or more gums or pectin. In another aspect, the vegetable is selected from carrot, mushroom, potato, pea, pumpkin, soy, or tofu. In another aspect, the meatless chip comprises proteins obtained from whey, soy, tofu, plant, seafood, or animal.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention includes a meat chip or crisp and compositions and methods of making the same.

As used herein, the term "organoleptic" refers to a sensation in the mouth of an individual, e.g., lightness, flavoring, texture, etc. In certain aspects, an improved organoleptic formulation or composition is one in which an individual experiences via the senses—including taste, sight, smell, and touch.

As used herein, the meat can be any meat that is suitable for human or animal consumption, including but not limited to beef, veal, buffalo, lamb, goat, chicken, pork, emu, ostrich, game hen, squab, guinea fowl, turkey, pheasant, quail, duck, or goose. The meat can be an animal or any part of an animal, including but not limited to: a whole animal, leg, thigh, breast, ribs, flank, loin, or other cut of meat, processed or ground meat.

As used herein, high oleic oil refers to any of a number or pure oils or oil blends that are high in monounsaturated fats. High oleic oils are beneficial because they include a number of important characteristics, such as, superior stability and longer fry life, no hydrogenation, fried food taste and performance, can include omega-9 fatty acids, and can be extremely low (or have no) saturated fat.

It is to be understood throughout this description that while high oleic sunflower oil is preferred, any oil of plant or animal origin can be used. The most used oils in mayonnaise are soybean oil, canola oil, safflower oil, peanut oil, corn oil, olive oil, but there are many others (avocado, algae) that can be used in the compositions of the present disclosure. More particularly, the oils fall into several classes: vegetable (canola, soybean, corn, avocado, etc.), nuts (peanut, coconut, walnut, almond, hazelnut, etc.), seeds (pumpkin, sunflower, cottonseed, sesame seed, etc.), animal (butterfat, lard, tallow, etc.), algal oil, and fish oils.

It is to be further understood that the sugar can be substituted with any sweetener like agave nectar, which is described further herein, as well as honey, high fructose corn syrup, and fruit concentrates.

Ideally the natural flavoring is *Quillaja*, which is approved by the FDA for human consumption. It is available from Desert King International located in San Diego, California, USA.

The present invention also includes a meatless chip made by a method of: blending a ground or whole fruit, or a ground or whole vegetable, or both the fruit and the vegetable, and a high oleic oil and gluconic acid, and optionally a seasoning, into a meatless batter; extruding the meatless batter into a casing; cooking to the meatless batter; slicing the meatless batter into meat slices; and microwave vacuum drying at a temperature not exceeding 200° F. the meat slices into the one or more meatless chip. Gluconic acid can be added at 0.1% to 1.0% weight to weight. A fruit can be selected from, for example, strawberry, blackberry, apricot, peach, raspberry, blueberry, bananas, mango, banana, *Papaya*, passion fruit, plum, pomelo, orange, kiwi, lemon, cherry, pear and apple. In another aspect, the method further comprises adding one or more gums or pectin. A vegetable is selected from, for example, carrot, mushroom, potato, pea, pumpkin, soy, or tofu. In another aspect, the meatless chip comprises proteins obtained from whey, soy, tofu, plant, seafood, or animal protein.

Design for Producing a Meat Chip (aw~0.05 to 0.20).
Meat base:
Chicken, finely ground deboned breast meat
Add:
    Emulsion (68% high oleic oil)
        5%=3.4% in raw product=~10% in dried product
        10%=6.8% in raw product=~18% in dried product
        15%=10.4% in raw product=~26% in dried product
Add seasoning (KFC® or Rotisserie or Buffalo wing, etc.)
Blend until uniform
Process:
Extrude meat batter into a case (~2 inch diameter; water impermeable casing).

Cook in a water bath at ~180 F for ~15 minutes, until thoroughly cooked and meat emulsion set.
  Can use a smokehouse process recommended by Alkar for wet sausages and use an edible casing, microwaved, or cooked by any method.
Slice at 2 to 4 mm thick.
Microwave vacuum dry with temperature of product not exceeding ~200° F., which is about 20 Torr, and 1200 watts to microwave. Generally, the higher the vacuum pulled the faster the drying and more puffing of the meat chip. Time depends on the chip thickness, and the level of vacuum and microwave power level can be adjusted accordingly.
Variables that may be adjusted:
Emulsion content:
  More emulsion=softer texture crunch.
Chip Thickness:
  More thickness=harder texture crunch
Microwave vacuum operating procedures:
  Microwave drying speed (temperature & vacuum dependent)=more or less puffing which affects the texture.
Meat Grind
  The grinding of the mean can be coarse, fine, or whole muscle can also be used.
  The meat can be brine injected and/or tumbled.
Other types of meat chips:
Pepperoni with pork meat base
BBQ beef with a beef meat base
Fermentation (pepperoni, BBQ, Buffalo wing):
Add a *Pediococcus* starter culture from Kerry Ingredients. Also add 2% dextrose (glucose) for the fermentation to grow. Hold at 108° F. for two hours in the water bath (until pH hits 5.4 to 5.6) then move to 180° F. to end the fermentation and start the pasteurization.
Emulsion:
29.6% water
68.0% High Oleic sunflower oil (Cargill's Clear Valley)
2.0% *Quillaja*
0.4% TIC Gum 1155 stabilizer/gum blend Design for the meat chip. The variables are: level of emulsion, chip thickness and the level of puffiness achieve by microwave vacuum drying variables (time, temperature and vacuum level). A meat blend is formed and extruded into a casing (peel-able casing) and cook to set the proteins. Since the drying is quick (30 minutes to 60 minutes), it is possible to optimize a blend and its thickness by changing the size of the opening of the extruder, the speed of the extrusion, and other extrusion conditions such as the speed of capture of the extrudate, viscosity of the extrudate, temperature of the extrudate, temperature and/or humidity in the room during extrusion. However, the skilled artisan will recognize that the drying time also depends on the load of the dryer. The fermentation adds the "tanginess", acidic bite to flavors like BBQ, Buffalo wing and Pepperoni (or salami, summer sausage).

In certain aspects, the meat chip of the present invention is all-natural, meaning that it does not include any non-natural preservatives. An example of a non-natural preservative is EDTA. If applicable, the meat chip may also include a variety of acidulants. Examples of acidulants include vinegar or acetic acid, gluconic acid, lemon juice, citric acid, as well as lactic acid or malic acid.

For fruit and/or vegetable chips made using the method of the present invention, the meat from the chip above can be substituted with the fruit and/or vegetable. The fruit and/or vegetable can be ground and/or whole, and extruded and cooked as described hereinabove. Flavorings can be added appropriate for the fruit and/or vegetable.

In one embodiment, the present invention includes a method of making one or more meat chips comprising, consisting essentially of, or consisting of: blending a meat product and a high oleic oil, and optionally a seasoning, into a meat batter; extruding the meat batter into a casing; cooking to the meat batter; slicing the meat batter into meat slices; and microwave vacuum drying at a temperature not exceeding 200° F. the meat slices into the one or more meat chip. In one aspect, the meat is selected from at least one of: beef, veal, buffalo, lamb, goat, chicken, pork, emu, ostrich, game hen, squab, guinea fowl, turkey, pheasant, quail, duck, or goose. In another aspect, the high oleic oil is selected from at least one of: a sunflower, soybean, safflower, canola, or algal oil. In another aspect, an emulsion is at least 3, 5, 10, or 15% high oleic oil. In another aspect, the method further comprises one or more preservatives and stabilizers selected from at least one of: phosphates, k-carrageenan, green tea extract, rosemary extract, mixed tocopherols, or celery powder, to 180 ppm nitrites. In another aspect, the cooking step is in a water bath, a smoker, smokehouse, an oven, or a microwave oven. In another aspect, if the meat is beef, then omitting at least one of nitrates and celery powder, or if the meat is chicken omitting nitrates. In another aspect, an emulsion is defined further as comprising at least one of: eggs that comprise one of 4% whole eggs or 2.0% egg yolks or further comprising, by weight, 0.01% to 1.0% of a gum or gum blend including one or more natural gums selected from the group consisting of gum Arabic, guar and Xanthan gum, or 0.2% k-carrageenan. In another aspect, the meat chip has an $A_w$ of 0.05 to 0.20. In another aspect, the meat slices have a thickness or 1, 2, 3, 4 or 5 mm prior to microwaving. In another aspect, the meat is contacted with the emulsion for at least 1 to 90 minutes at room temperature. In another aspect, method further comprises the step of chemical tenderizing the meat selected from the group consisting of aging in the composition, acids, spices, enzymes, and combinations thereof. In another aspect, the method further comprises the step of mechanical tenderizing selected from the group consisting of pounding, needle tenderizing, injecting, grinding, and combinations thereof. In another aspect, the meat is a whole animal, leg, thigh, breast, ribs, flank, loin, sausages, processed meat products, jerky, or other cut of meat, processed or ground meat. In another aspect, the method further comprises the step of fermenting the meat to a pH of 5.4 to 5.6 prior to cooking.

In one embodiment, the present invention includes a meat chip product made by a method comprising, consisting essentially of, or consisting of: blending a meat product, a high oleic oil, a seasoning, and optionally one or more fruits or vegetables into a meat batter; extruding the meat batter into a casing; cooking to the meat batter; slicing the meat batter into meat slices; and microwave vacuum drying at a temperature not exceeding 200° F. the meat slices into a meat chip. In one aspect, the meat is selected from at least one of: beef, veal, buffalo, lamb, goat, chicken, pork, emu, ostrich, game hen, squab, guinea fowl, turkey, pheasant, quail, duck, or goose. In another aspect, the high oleic oil is selected from at least one of: a sunflower, soybean, safflower, canola, or algal oil. In another aspect, the emulsion is at least 3, 5, 10, or 15% high oleic oil. In another aspect, the meat chip product further comprises one or more preservatives or stabilizers selected from at least one of: phosphates, k-carrageenan, green tea extract, rosemary extract, mixed tocopherols, or celery powder, to 180 ppm nitrites. In another aspect, the cooking step is in a water bath, a smoker, an oven, or a microwave oven. In another aspect, the emulsion is defined further as comprising at least one of: eggs that comprise one of 4% whole eggs or 2.0% egg yolks or further comprising, by weight, 0.01% to 1.0% of a gum or gum blend including one or more natural gums selected from the group consisting of gum Arabic, guar and Xanthan gum, or 0.2% k-carrageenan. In another aspect, the meat chip has an $A_w$ of 0.05 to 0.20. In another aspect, the meat slices have a thickness or 1, 2, 3, 4 or 5 mm prior to microwaving. In another aspect, the meat is contacted with the emulsion for at least 1 to 90 minutes at room temperature. In another aspect, the meat chip product further comprising the step of chemical tenderizing the meat selected from the group consisting of aging in the composition, acids, spices, enzymes, and combinations thereof. In another aspect, the meat chip product further comprising the step of mechanical tenderizing selected from the group consisting of pounding, needle tenderizing, injecting, grinding, and combinations thereof. In another aspect, the meat is a whole animal, leg, thigh, breast, ribs, flank, loin, sausages, processed meat products, jerky, or other cut of meat, processed or ground meat. In another aspect, the meat chip product further comprising the step of fermenting the meat to a pH of 5.4 to 5.6 prior to cooking.

In one embodiment, the present invention includes a method of making a meatless chip comprising, consisting essentially of, or consisting of: blending a ground or whole fruit, or a ground or whole vegetable, or both the fruit and the vegetable, and a high oleic oil and gluconic acid, and optionally a seasoning, into a meatless batter; extruding the meatless batter into a casing; cooking to the meatless batter; slicing the meatless batter into meat slices; and microwave vacuum drying at a temperature not exceeding 200° F. the meat slices into the one or more meatless chip. In another aspect, the gluconic acid is added at 0.1% to 1.0% weight to weight. In another aspect, the fruit is selected from at least one of: strawberry, blackberry, apricot, peach, raspberry, blueberry, bananas, mango, banana, *Papaya*, passion fruit, plum, pomelo, orange, kiwi, lemon, cherry, pear and apple. In another aspect, the method further comprises adding one or more gums or pectin. In another aspect, the vegetable is selected from carrot, mushroom, potato, pea, pumpkin, soy, or tofu. In another aspect, the meatless chip comprises proteins obtained from whey, soy, tofu, plant, seafood, or animal.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited features, elements, components, groups, integers, and/or steps, but do not exclude the presence of other unstated features, elements, components, groups, integers and/or steps. In embodiments of any of the compositions and methods provided herein, "comprising" may be replaced with "consisting essentially of" or "consisting of". As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only. As used herein, the phrase "consisting essentially of" requires the specified features, elements, components, groups, integers, and/or steps, but do not exclude the presence of other unstated features, elements, components, groups, integers and/or steps as well as those that do not materially affect the basic and novel characteristic(s) and/or function of the claimed invention.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A method of making one or more meat chips consisting of:
   blending a meat product in an emulsion of about 29% water, 68% sunflower oil, a seasoning, one or more preservatives and stabilizers, an egg, and a gum or a gum blend, into a meat batter;
   mechanically or chemically tenderizing the meat batter by at least one of pounding, needle tenderizing, injecting, or grinding;
   fermenting the meat batter to a pH of 5.4 to 5.6 prior to cooking;
   extruding the meat batter into a casing;
   cooking the meat batter in the casing in a water bath;
   slicing the casing with the cooked meat batter into meat slices; and
   microwave vacuum drying at a temperature not exceeding 200'F the meat slices into the one or more meat chips, wherein the one or more meat chips has an $a_w$ of 0.05 to 0.2.

2. The method of claim 1, wherein the meat is selected from at least one of:
   beef, veal, buffalo, lamb, goat, chicken, pork, emu, ostrich, game hen, squab, guinea fowl, turkey, pheasant, quail, duck, or goose.

3. The method of claim 1, wherein the one or more preservatives and stabilizers are present in the emulsion and are selected from at least one of: phosphates, k-carrageenan, green tea extract, rosemary extract, mixed tocopherols, celery powder, or nitrites.

4. The method of claim 1, wherein the eggs consist of 4% weight to weight whole eggs or 2.0% weight to weight egg yolks, the gum or gum blend consists of weight to weight, 0.01% to 1.0% of one or more natural gums selected from the group consisting of gum Arabic, guar and Xanthan gum, and the one or more preservatives and stabilizers consists of 0.2% k-carrageenan.

5. The method of claim 1, wherein the meat slices have a thickness of 1, 2, 3, 4 or 5 mm prior to microwaving.

6. The method of claim 1, wherein chemically tenderizing is selected from tenderizing the meat in acids, spices, enzymes, and combinations thereof.

7. The method of claim 1, wherein the meat is a whole animal, leg, thigh, breast, ribs, flank, loin, sausages, processed meat products, jerky, or other cut of meat, processed or ground meat.

* * * * *